United States Patent [19]

Gondhalekar

[11] Patent Number: 5,767,597
[45] Date of Patent: Jun. 16, 1998

[54] ELECTROMAGNETICALLY BIASED HOMOPOLAR MAGNETIC BEARING

[75] Inventor: Vijay Gondhalekar, New York, N.Y.

[73] Assignee: SatCon Technology Corp., Cambridge, Mass.

[21] Appl. No.: 687,661

[22] Filed: Jul. 26, 1996

[51] Int. Cl.⁶ .................................................. H02K 7/09
[52] U.S. Cl. ............................................................. 310/90.5
[58] Field of Search ............................................ 310/90.5

[56] References Cited

U.S. PATENT DOCUMENTS

| | | | |
|---|---|---|---|
| 4,077,678 | 3/1978 | Studer et al. | 308/10 |
| 4,918,345 | 4/1990 | Vaillant De Guelis et al. | 310/90.5 |
| 5,216,308 | 6/1993 | Meeks | 310/90.5 |
| 5,514,924 | 5/1996 | McMullen et al. | 310/90.5 |
| 5,625,240 | 4/1997 | Bernus | 310/90.5 |

Primary Examiner—Steven L. Stephan
Assistant Examiner—Judson H. Jones
Attorney, Agent, or Firm—David G. Conlin; William J. Daley, Jr.

[57] ABSTRACT

A homopolar radial magnetic bearing includes a single bias coil common to a plurality of pole pieces equi-angular spaced from each other, a plurality of control coils, one control coil being disposed at each pole piece and a rotor being secured to the rotating member. The bias coil and each of the control coils cooperate with each pole piece so as to establish a homopolar magnetic field for rotatably supporting a rotating member. The bias coil is circumferentially disposed about the rotating member and passes through an inside area at one end of each pole piece. A control coil is wrapped around the other end of each pole. In operation, the bias coil establishes a steady state electromagnetic field to suspend the rotating member when it is energized. Each of the control coils are configured so as to be selectively and individually energized to establish another magnetic field that is superimposed on the steady state magnetic field to yield a net magnetic field that suspends and centers the rotating member. Preferably there are an even number of pole pieces and control coils, so that pairs of pole pieces are in a diametrically opposed relation.

14 Claims, 4 Drawing Sheets

ELECTROMAGNETICALLY BIASED HOMOPOLAR MAGNETIC BEARING

The U.S. Government has a paid up nonexclusive, nontransferable license to practice or have paracticed for or on behalf of the United States this invention throughout the world as provided for by the terms of contract No. DAAJ02-92-C-0052 awarded by the U.S. Army.

FIELD OF INVENTION

This invention relates to magnetic bearings and magnetic suspension systems and more particularly to homopolar magnetic bearings and suspension systems.

BACKGROUND OF THE INVENTION

Bearings are used to rotatably support a shaft so it is maintained in the proper alignment required during operation as well as to reduce frictional losses, noise and wear. Typically, the shaft is centered within the bearing's enclosure so the shaft does not come into contact with the housing or bearing enclosure as it rotates. Magnetic bearings and non-magnetic or conventional mechanical bearings are two types of bearings that are used to rotatably support a shaft.

The types of conventional non-magnetic bearings include, for example, ball bearings, roller bearings and needle bearings. These bearings, however, have a number of disadvantages such as requiring the use of a lubricant to keep the bearings working properly, to reduce frictional losses and to dissipate heat energy. As such, the bearings and bearing housing are designed to keep the lubricant from escaping as well as to maintain the bearing in its proper alignment.

Because the components of conventional bearings typically are in motion (e.g., rotating or spinning) during use, heat energy is generated. This heat energy must be dissipated to avoid bearing damage and shortening or reduction of the bearing's expected life. Thus, to maintain the integrity of the bearing, the bearing and the associated enclosure are designed to dissipate the generated heat energy. Alternatively, the heat energy is dissipated using the bearing lubricant as a cooling medium and cooling the lubricant (e.g., using a heat exchanger).

For airplane gas turbine engines, ceramic bearings have been used because of the very high rotational speeds (e.g., 35,000-50,000 rpm) of the turbine shafts, of the high temperatures and of the high loads or g-forces the bearings undergo when an airplane is maneuvering. These bearings are very expensive, for example, each bearing set costs on the order of $2,000. Also the operational stresses, the high rotational speeds and high temperatures makes the lubrication of the bearings very difficult.

Magnetic bearings are a non-contact type of bearing that effectively levitates or floats the rotating shaft/member by the developed magnetic fields. Magnetic fields are developed by permanent magnets or electromagnets that are arranged in a predetermined fashion about a rotating shaft or member. Because magnetic bearings are non-contact bearings, there is not the high speed frictional concerns as there is with conventional bearings. Also, mechanical noise is reduced in comparison to conventional bearings because of the avoidance of mechanical abrasion by magnetic bearings.

For one grouping of magnetic bearings, the permanent magnets or electromagnets are arranged so the magnetic poles alternate (e.g. north, south, north, etc.) about the rotating shaft. This is sometimes referred to as a multi-polar arrangement. The multi-polar arrangement results in eddy currents that lead to a loss of effective force exerted by the magnetic bearing on the rotatably supported shaft. To minimize eddy current losses, at least the portion of the rotating member proximal the magnetic bearing includes a laminated structure. The use of laminated structures or laminations, however, increases the overall cost and size of the bearing. It is also limits the choice of materials, as well as the rotational speed of the rotor.

There is described in U.S. Pat. No. 5,216,308, a magnetic bearing assembly that uses adjacent radial and thrust magnetic bearings to provide controlled radial, thrust and moment load support of a shaft relative to a housing. The radial magnetic bearing includes an arcuate U-shaped pole piece that extends about the rotating shaft to be supported. An arcuate ring, preferably of a laminated construction, is centrally positioned within the pole piece. When so positioned, two gaps are formed between the pole piece and ring.

Two electromagnetic coils (the bias coils) are disposed within the pole piece in the two gaps formed by arcuate ring and both extend circumferentially about the shaft. These electromagnetic coils are claimed to generate a high density magnetic flux and create a magnetic field that suspends the shaft when energized. It is also claimed that the bias coils create an axially polarized homopolar magnetic field. The flux path for each electromagnetic coil is shown as being directed through the pole piece, thence through the rotor and then back through the arcuate laminated ring (i.e., two flux paths one for each coil).

The arcuate laminated ring is provided with a plurality of slots for receiving the active electromagnetic control coils. The active electromagnetic control coils, when energized, are claimed to be capable of generating a radially polarized controllable electromagnetic field. This control coil arrangement yields two flux paths, in which each encompass about half a circumference of the arcuate ring.

The described radial magnetic bearing has a number of disadvantages including a long axial length resulting from the presence of the laminated arcuate ring. A long axial length results in larger and bulkier bearing structures that are ill suited for gas turbine engine applications where axial space is limited.

Also, because of the design and arrangement of the control coils, it would be necessary to wrap a large number of turns of copper wire about the laminated ring to increase the control force magnitude for heavy load requirements such as that seen with gas turbine engines for airplanes. The increased wiring increases the cost, weight and heat dissipation of the overall magnetic bearing system.

The bias flux for this prior art magnetic bearing is exerted over 3 pole faces:—left outer pole; inner circumferential laminated ring; and the right outer pole. Whereas, the control flux, and hence the control forces between the static and rotating members, is exerted only at the inner circumferential laminated ring. That is, the pole face at which control forces are exerted is approximately ⅓ of the available pole surface area, where the pole surface area is the area of the pole face(s) next to the rotating member. However, the positive feedback term results from all the available pole surface area (left outer, inner and right outer pole). The positive feedback term and the control effectiveness terms of a magnet bearing are respectively related to the change in magnetic energy contained in the air gap affected by an incremental change in the air gap and incremental change in control current. An incremental change in air gap affects the energy contained in the volumetric space between all 3 pole faces (i.e., outer, inner and right outer poles) and the rotating member. This contributes directly to the positive feedback term. An incremental change in control current affects the energy contained only in the volumetric space between the inner poles and the rotating member (i.e., only 1 pole face affects the control effectiveness term). Hence, in order to overcome the positive feedback term, a control current about 3 times as great is required, as compared, to a bearing where all available pole face area contributes to the control effectiveness term.

There is, therefore, a need for a low cost, compact radial magnetic bearing that is simple in construction and assembly, that has a comparatively small axial length, that is better suited for high rotational speed applications and that allows for better rotor characteristics.

SUMMARY OF THE INVENTION

The radial magnetic bearing, in accordance with the instant invention, rotatably supports a rotating shaft or member particularly under the high loading, high temperature and high speed conditions seen with gas turbine engines. Because the magnetic field being developed is homopolar, there are no eddy current losses in the rotating member. For the instant invention, homopolar shall be understood to mean that the polarity of all poles circumferentially adjacent and next to the rotating member have the same polarity, either North or South.

Further, the radial magnetic bearing of the instant invention yields a structure capable of having a shorter axial length, and thus an overall compact size and lighter weight, than that for known prior art homopolar magnetic bearings. Additionally, the magnetic bearing of the instant invention involves fewer parts than that for such prior art bearings. As such, the radial magnetic bearing of the instant invention is less costly to make and operate. The radial magnetic bearing of the instant invention is also less costly to make and operate than known ceramic conventional bearings used for gas turbine applications.

The radial magnetic bearing of the instant invention includes a rotor piece secured to the rotating member, a single bias coil, a plurality of control coils and a plurality of magnetic pole pieces. The pole pieces are equiangular spaced from each other and there is one control coil disposed at each pole piece location. Preferably, there are an even number of pole pieces, so there are pairs of diametrically opposed pole pieces thereby establishing a push-pull type of pole arrangement. In a specific embodiment, there are four control coils and four pole pieces where each of a pair of pole pieces are diametrically opposed. The bias coil and the control coils cooperate with the magnetic pole pieces so as to establish a homopolar magnetic field for rotatably supporting and suspending a rotating member. The bias coil and the control coils are constructed using any of a number of materials including copper and aluminum.

The bias coil is circumferentially disposed about the rotating member and passes through an inside area at one end of each pole piece. In this way, the bias coil interlinks or is common to each pole piece location so when the bias coil is energized, a strong steady state electromagnetic field is established at each pole location. Thus, the bias coil creates a constant and equal magnetic force from each pole piece to suspend the rotating member for all anticipated loading conditions. This is particularly advantageous because the control coils do not have to adjust for magnetic flux differences between the poles because there is not an individual bias coil at each pole location.

Each control coil is wrapped around the other end of the pole piece. Each of the control coils are selectively and individually energized to establish another magnetic field that is superimposed on the steady state magnetic field to return the rotating member and stabilize it in the desired operational position (e.g., centered in the bearing enclosure). The energization of the control coils is responsive to position sensors (e.g., eddy current, inductive or capacitive device) and conventional control circuitry that determine the position of the rotating member and controls the energization level of the control coils.

Each pole piece preferably is horse-shoe or "U" shaped and each horse-shoe shaped pole piece is arranged so the open end of the pole piece faces the rotating member and the two legs of the pole piece are perpendicular to a long axis of the rotating member. Further, the bias coil preferably is located in the inside area between the two horse-shoe legs and each control coil preferably is wrapped around the base of the pole piece. As such, the bias coil is disposed inwardly of the control coil. This arrangement also allows the magnetic flux of the bias coil and each control coil to be directed through the highly magnetic permeable pole piece.

BRIEF DESCRIPTION OF THE DRAWING

For a fuller understanding of the nature and desired objects of the present invention, reference should be made to the following detailed description taken in conjunction with the accompanying drawing figures wherein like reference character denote corresponding parts throughout the several views and wherein.

DESCRIPTION OF THE PREFERRED EMBODIMENT

Figure 1:
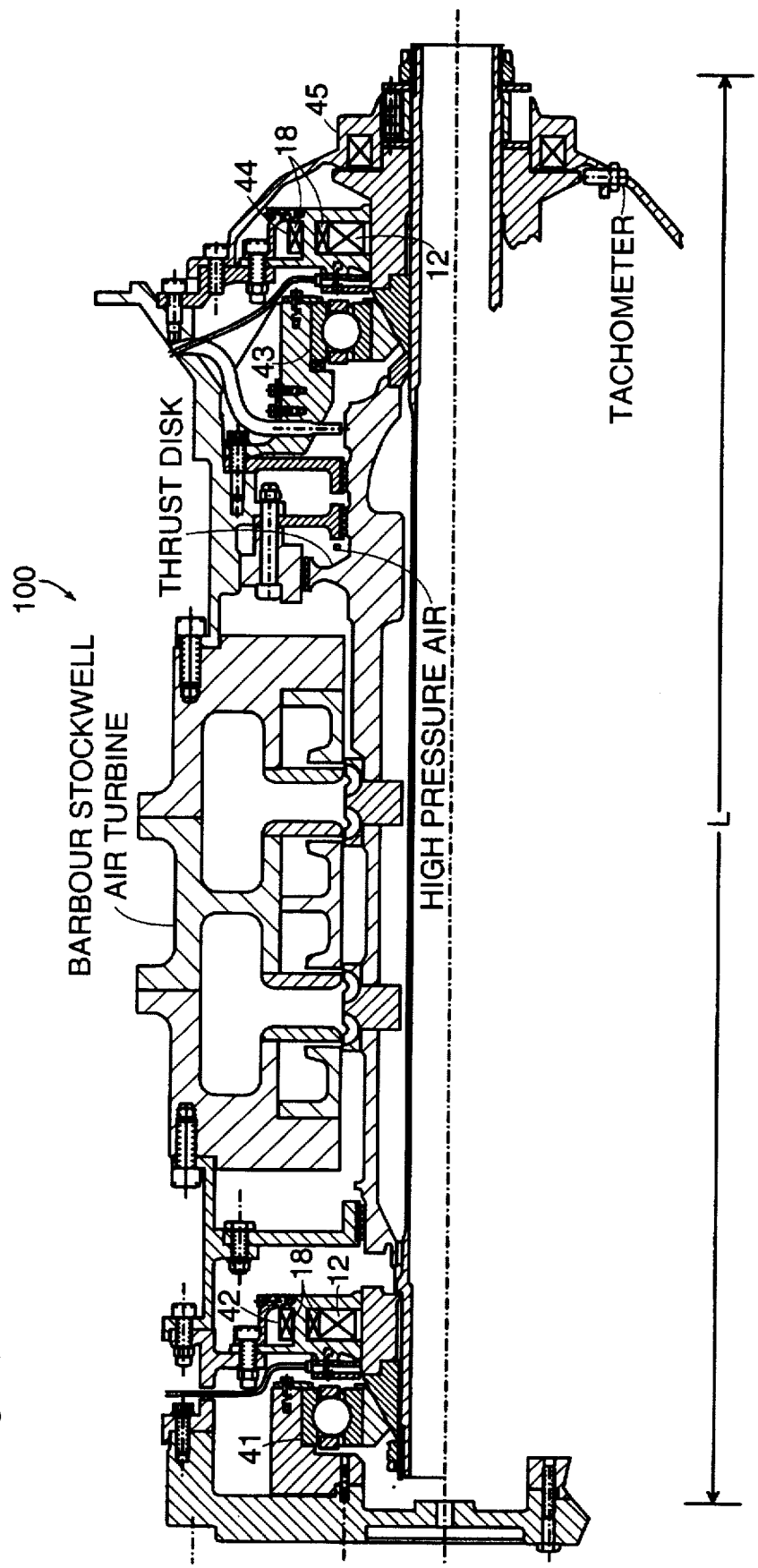
FIG. 1 is a partial cross sectional view of an air turbine engine with a homopolar radial magnetic bearing according to the present invention.

Referring now to the various figures of the drawing wherein like reference characters refer to like parts, there is shown in FIG. 1, a Barbour Stockwell type air turbine engine 100. The forward stator radial bearing 42 and aft stator radial bearing 43 of the turbine engine 100 are configured with the homopolar radial magnetic bearings 10 of the instant invention. The radial magnetic bearing 10 is discussed in detail in connection with FIGS. 2–3. This results in an overall engine assembly that can have a shorter axial length as compared to an engine assembly using prior art magnetic bearings. Further, because the magnetic bearing 10 of the instant invention includes a single circumferential bias coil 12 with no end turns, that is common to all control coils, heat generation is lower in comparison to prior art magnetic bearings. Other advantageous features in view of prior art magnetic bearings include fewer parts and simpler construction/assembly.

The homopolar radial magnetic bearing 10 of the instant invention is not limited to use with the foregoing described air turbine engine. Rather, it is within the scope of the instant invention for the radial magnetic bearing to be used in connection with any device or apparatus having a rotating member. In-particular, for applications where axial space along the rotating member is at a premium such as, for example, turbomolecular pumps and high speed centrifuges. As illustrated in FIG. 1, the forward and aft auxiliary bearings 41,43 are conventional back-up bearings. The stator axial bearing 45 also is a homopolar unidirectional thrust bearing.

Figure 2:
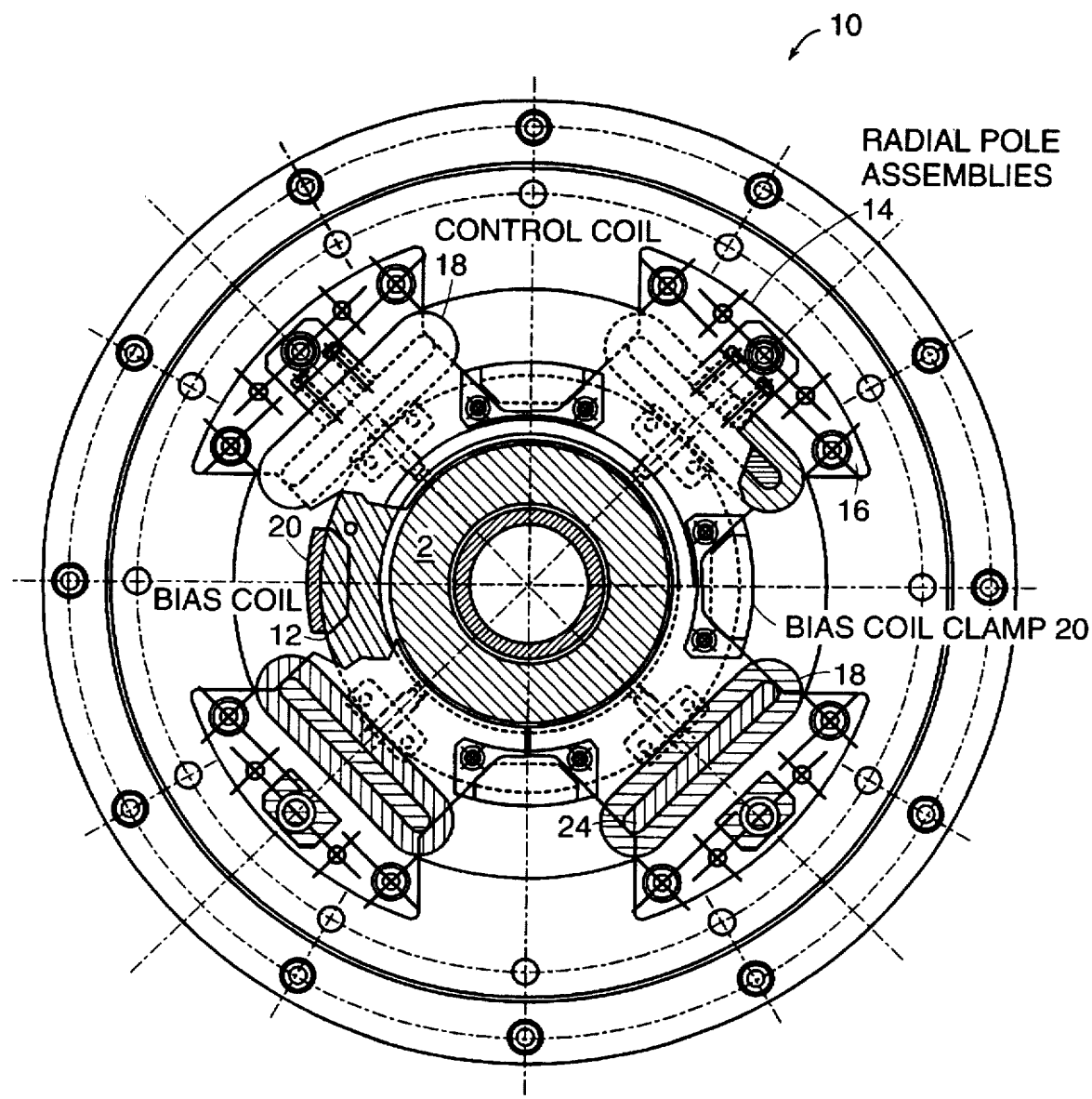
FIG. 2 is a side view, partially in cross section, of a four pole homopolar radial magnetic bearing according to the instant invention.
Figure 3:
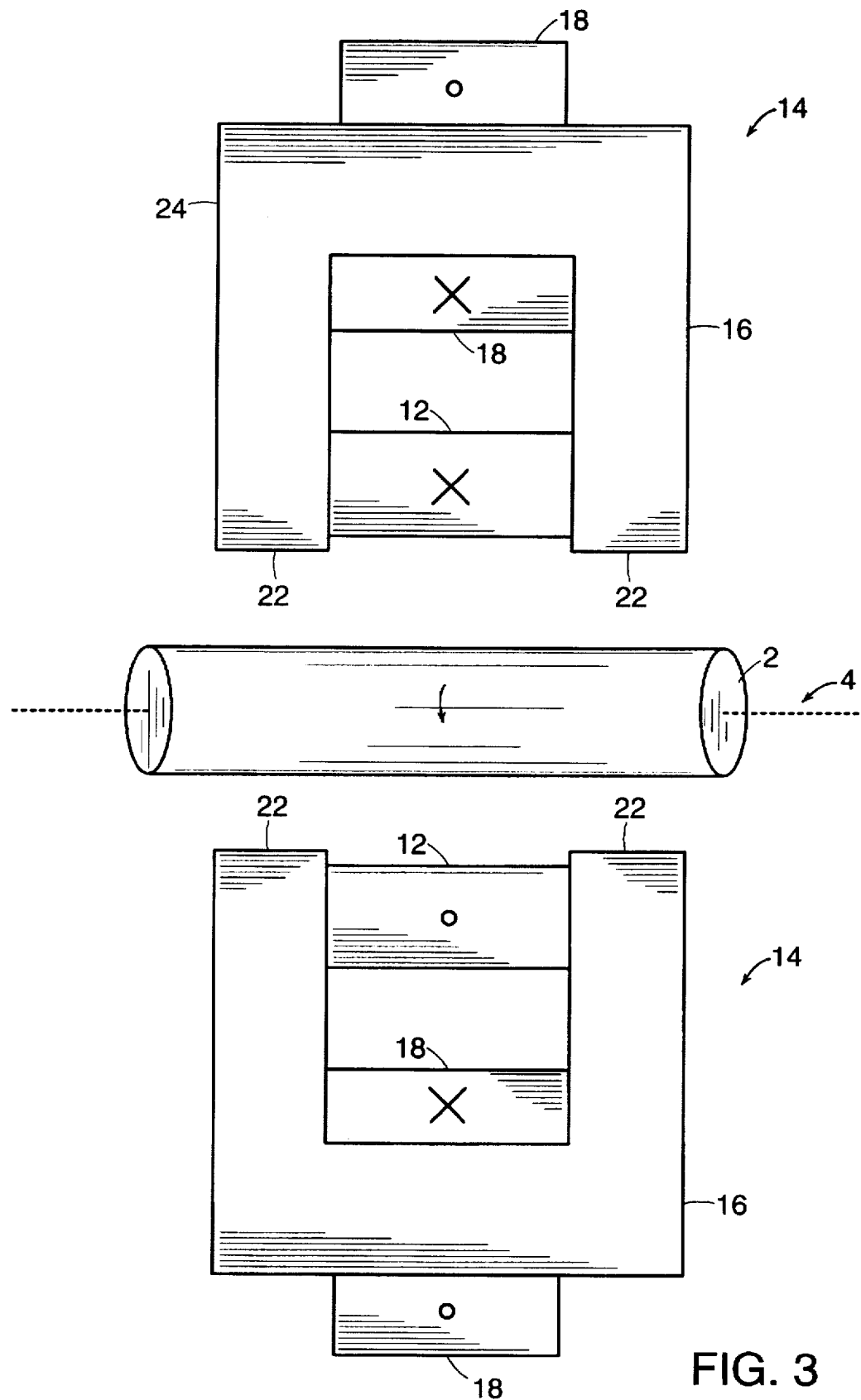
FIG. 3 is a schematic cross sectional view of the homopolar radial magnetic bearing of FIG. 2.

Now referring to FIG. 2, there is shown a side view, partially in cross section, of a four pole homopolar radial magnetic bearing 10 according to the instant invention. A schematic cross sectional view of this magnetic bearing 10 is shown in FIG. 3. In a preferred embodiment, the homopolar radial magnetic bearing 10 of the instant invention includes a bias coil 12 and four electromagnetic pole assemblies 14. However, the radial magnetic bearing 10 may be configured with any number of electromagnetic pole assemblies 14.

The bias coil 12 is disposed about, and is coaxial with, the rotating shaft or rotating member 2. The bias coil 12 preferably is retained in place by means of a plurality (e.g., four) of bias coil clamps 20. The bias coil 12 traverses each of the electromagnetic pole assemblies 14 so it passes through the inside of the horse-shoe shaped region of each of the four poles pieces 16 as shown more clearly in FIG. 3. As such, when the bias coil 18 is energized, the magnetic flux being generated passes through each pole piece 16 and out the distal ends 22 thereof.

The electromagnetic pole assemblies 14 preferably are equiangularly spaced about and radially spaced from the bias coil 12 and the rotating member 2. Preferably, there are an even number of pole assemblies 14 and each pair of pole assemblies are diametrically opposed so the pair of poles can operate in tandem.

Each electromagnetic pole assembly 14 includes a pole piece 16 and control coil 18. In one embodiment, the pole piece 16 is horse-shoe or "U"shaped. Preferably, the pole piece 16 is constructed from a highly magnetically permeable material such as high saturation magnetic steels, for example, cobalt steels. Also, a suitable coil material for the bias coil 12 and control coils 18 include copper and aluminum. The pole piece 16 of each electromagnetic pole assembly 14 is arranged so the open end of the horse-shoe or "U" faces towards the rotating member 2 and the sides of the horse-shoe are perpendicular to the long axis 4 of the rotating member. It is within the scope of the present invention for the ends of the "U" shaped member to include additions such as varying the shape of the ends or sides of the "U", for example, flaring out the ends.

The control coil 18 of each pole assembly 14 is wrapped around the corresponding pole piece 16. In the illustrated embodiment, the control coil 18 is wrapped around the base 24 of the horse-shoe shaped pole piece. As such, when the control coil 18 is energized, the magnetic flux being generated passes through the pole piece 22 and out the distal ends 22 thereof of each pole assembly. In comparison to control coils of prior art magnetic bearings, the control coils 18 of the instant invention are smaller and require less electrical current for operation. Also, becuase all pole faces of each pole 14 for the magnetic bearing 10 of the instant invention are available, control effectiveness is higher in comparison to prior art bearings.

The common bias coil 12 and the smaller control coils 18 yields a magnetic bearing 10 that is axially compact in comparison to known magnetic bearings. For example, as compared to the structure of one prior art magnetic bearing that uses a laminated structure as a flux path, the axial length of a radial magnetic bearing 10 of the present invention is a factor of about three smaller.

A short axial length reduces the overall size of the magnetic bearing assembly. This is especially advantageous in gas turbine engines where the packaging space is at a premium. Further, minimizing the bearing axial length can result in shorter lengths of the rotors or rotating member as well as yielding desirable rotor dynamic characteristics. Also, because the operational current requirements are reduced, the amount of heat generated by the control coils 18 and required to be dissipated is reduced correspondingly. Moreover, the single bias coil common to all control coils is more efficient than several individual bias coils. The circumferential form of the bias coil of this invention does not have end turns which generate a sizable fraction of the total heat in a typical prior art magnetic bearing geometry.

In operation, the bias coil 12 is energized with a steady state or DC current, for example a bias current in the 1–2 amp range. As such, the magnetic polarity of the pole piece 18 adjacent the rotating member 2 is the same (i.e., homopolar) and the same force is generated at each magnetic pole assembly 14. Correspondingly, a magnetic pole of opposite polarity is induced into the rotating member 2. The magnetic field being generated by the bias coil 12 is sufficient to suspend and rotatably support a given rotating member 2, with respect to a housing or stationary member containing the magnetic bearing 10, for all expected loading conditions.

Because of the inverse relationship of magnetic force over distance, it is possible for a rotating member 2 to be drawn to one side or the other within the bearing housing, even in the presence of a constant magnetic field. This is sometimes referred to as the "negative spring" effect. To counteract this effect and re-center the rotating member 2, each of the control coils 18 are individually energized so a variable electromagnetic field can be generated. An AC current with a small superimposed DC component energizes each of the control coils 18.

When so energized, the magnetic field established by the control coils 18, when superimposed on the magnetic field established by the bias coil 12, causes the rotating member 2 to return to and be maintained in its desired operational position. In this way, the magnetic bearing 10 of the instant invention can effect a change in the position of the rotating member 2 as well as stabilize the operational position of rotating member.

The resultant magnetic field of the bias coil 12 and control coils 18, however, remains homopolar. Thus, field losses associated with magnetic field eddy currents are minimized or avoided. Also, the rotating member 2 or the portion of the rotating member proximal the magnetic bearing need not be laminated to counteract eddy currents. Accordingly, an apparatus using a magnetic bearing 10 of the instant invention would be less costly since lamination is not required to address eddy current concerns. A solid rotor, as compared to a laminated one, can be designed to run at greater rotational speeds. Also there is a wider choice of material when lamination is not an issue. It should be recognized, however, that it is within the scope of the present invention for the rotating member, or a part thereof, to be laminated in accordance with any one of a number of known lamination techniques.

The magnetic flux of both the bias coil 12 and each control coil 18 is exerted over all the available pole surface

7 area of each pole assembly 14 (i.e., the area of the pole face next to the rotating member). As indicated in the foregoing, the positive feedback term and control effectiveness terms of a magnetic bearing are respectively related to the change in the magnetic energy contained in the air gap which is affected by an incremental change in the air gap and an incremental change in the current to the control coils. For the instant invention, changes in the current to the control coils 18 affects the magnetic energy in the volumetric space between all the pole faces of each pole assembly and the rotating member 2. Thus, the positive feedback term is overcome using a smaller current than would be required if the control current affected a change to a smaller region of the air gap as done for the above described prior art magnetic bearing. Thus, the magnetic bearing of the present invention can operate over a much smaller control bandwidth and smaller control voltages can be applied to the bearing coils, as compared to other prior art magnetic bearings.

Figure 4:
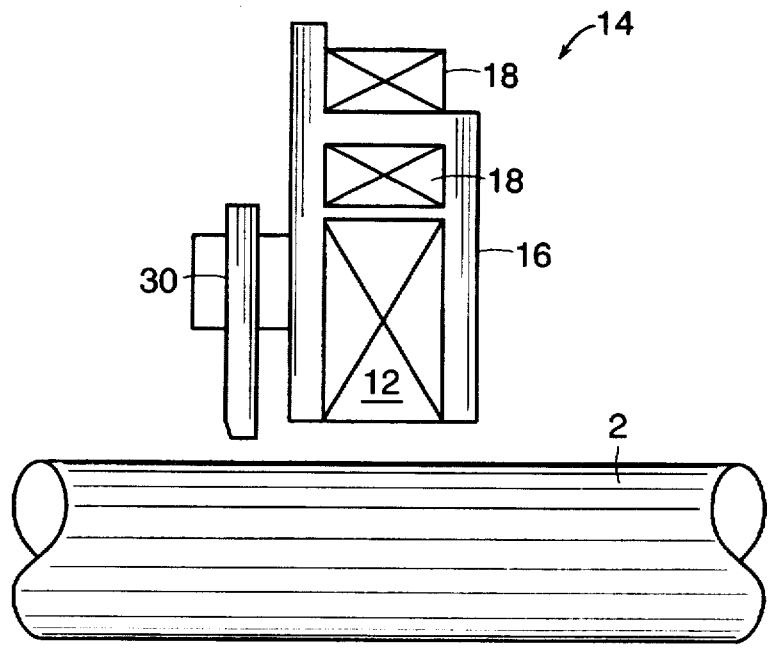
FIG. 4 is a schematic side view of a pole assembly with a position sensor for the rotating member.

Referring to FIG. 4, there is shown a pole assembly 14 on which is mounted a position sensor 30 for determining the position of the rotating member 2. The position sensor 30 can be any number of sensing devices or means that can sense the deviation of the rotating member 2 from its desired operational position, including eddy current, inductive or capacitive devices. Preferably, the position sensor 30 is mounted as close as possible to the pole assembly 14. This minimizes axial length as well as provides better control of rotor oscillations.

Figure 5:
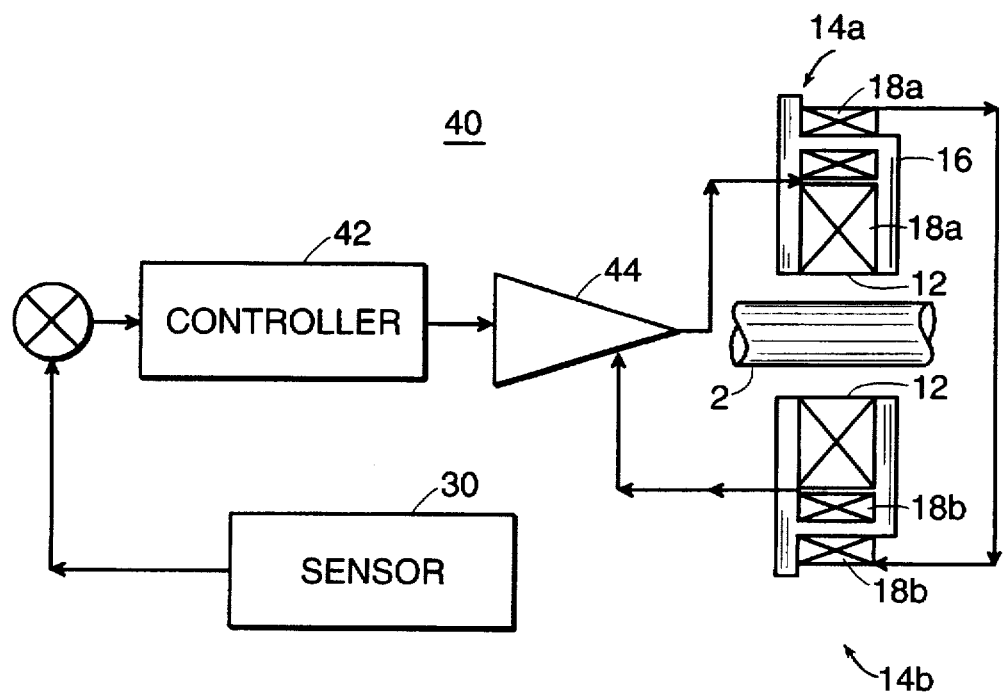
FIG. 5 is a block diagram at the control circuit for one pair of pole assemblies.

There is shown in FIG. 5 a block diagram of the circuitry 40 that controls the energization level of the control coils 18a,b for a pair of diametrically opposed pole assemblies 14a,b. The output of the position sensor 30 for that pair of pole assemblies 40a,b is continuously fed to a controller 42 such as an analog or digital control circuit known to those skilled in the art. The controller 42 evaluates the sensor outputs and controls the amplifier 44 so as to continuously adjust the level of energization (i.e., increase or decrease) that drives the control coils 18a,b for the pair of opposed assemblies 14a,b. This "push pull" arrangement for the pair of control coils 18a,b reduces the number of amplifiers and the amplifier power in comparison to prior art magnetic bearings.

As indicated in the foregoing discussion for FIGS. 2-3, the magnetic bearing 10 of the instant invention preferably includes four electromagnetic pole assemblies 14. In this embodiment, the magnetic bearing 10 also includes 2 position sensors 30 and a control circuit 40 for each of the two pairs of diametrically opposed assemblies. The position sensors 30 are mounted orthogonal to each other so positional deviations of the rotating member 2 along two axes are detected. Similarly the control circuits 40 are controlled responsive to the sensors 30 so the rotating member is moved along these two axes.

In operation, when the sensors 30 determine that the rotating member 2 has moved from its desired operational position, the control circuitry 40 continuously adjusts the level of energization of each pair of control coils 18. This in turn generates the magnetic field that returns the rotating member 2 to, and maintains it in, the desired operational position.

Although a preferred embodiment of the invention has been described using specific terms, such description is for illustrative purposes only, and it is to be understood that changes and variations may be made without departing from the spirit or scope of the following claims.

8

What is claimed is:

1. A radial magnetic bearing for a rotating member comprising:
   a rotor piece secured to the rotating member;
   a stator including a plurality of magnetic pole pieces, being equi-angular spaced from each other;
   a bias coil common to the plurality of pole pieces;
   a plurality of control coils, one coil being disposed at each pole piece; and
   wherein the common bias coil and each of the control coils cooperate with each pole piece so as to establish a homopolar magnetic field that rotatably supports the rotating member.

2. The radial magnetic bearing of claim 1, wherein the bias coil is circumferentially disposed about the rotating member.

3. The radial magnetic bearing of claim 1, wherein the control coil is wrapped around one end of the pole piece at each location and wherein the bias coil passes through an inside area at another end of the pole piece.

4. The radial magnetic bearing of claim 3, wherein there are four pole pieces and four control coils.

5. The radial magnetic bearing of claim 3, wherein the bias coil, when energized, establishes a steady state electromagnetic field to suspend the rotating member and wherein each of the control coils are configured so as to be selectively and individually energized to establish another magnetic field that is superimposed on the steady state magnetic field.

6. The radial magnetic bearing of claim 3, wherein the pole piece is a horse-shoe shaped and wherein each pole piece is arranged so the open end of the pole piece faces the rotating member and the two legs of the pole piece are perpendicular to a long axis of the rotating member.

7. The radial magnetic bearing of claim 6, wherein the bias coil is in the inside area between the two horse-shoe legs.

8. The radial magnetic bearing of claim 6, wherein each control coil is wrapped around the base of each horse-shoe shaped pole piece.

9. The radial magnetic bearing of claim 1, wherein the pole pieces are provided in pairs and wherein the pole pieces of each pair are in a diametrically opposed relation.

10. The radial magnetic bearing of claim 1, wherein a same polarity magnetic pole is established at each pole piece by the common bias coil.

11. The radial magnetic bearing of claim 1, wherein a same magnetic polarity pole is established at each pole piece by the common bias coil and the control coil disposed at each pole piece.

12. The radial magnetic bearing of claim 5, wherein a same polarity magnetic pole is established at each pole piece by the common bias coil.

13. The radial magnetic bearing of claim 5, wherein a same magnetic polarity pole is established at each pole piece by the common bias coil and the control coil disposed at each pole piece.

14. A radial magnetic bearing for a rotating member comprising:
   a rotor piece secured to the rotating member;
   a stator including a plurality of magnetic pole pieces, being equi-angular spaced from each other;
   a bias coil being circumferentially disposed about the rotating member and passing through an inside area of one end of each pole piece so the bias coil is common to the plurality of pole pieces;

wherein the bias coil is configured so a same magnetic polarity is established at each pole piece and a homopolar steady state electromagnetic field is established to suspend the rotating member when the bias coil is energized;

a plurality of control coils, one coil for each pole piece and being wrapped around another end of the pole piece;

wherein the plurality of coils are configured so as to be selectively and individually energized so as to establish a magnetic field that is superimposed on the homopolar magnetic field established by the bias coil;

wherein the magnetic fields being established by both the bias coil and the plurality of control coils cooperate with the plurality of pole pieces so as to establish a homopolar magnetic field that rotatably supports the rotating member.

* * * * *